United States Patent

Austin et al.

[11] 3,956,300
[45] May 11, 1976

[54] REACTIVE TRIAZINYL DYESTUFFS

[75] Inventors: Peter William Austin; Alan Thomas Costello; Allen Crabtree, all of Manchester, England

[73] Assignee: Imperial Chemical Industries Limited, London, England

[22] Filed: Aug. 5, 1974

[21] Appl. No.: 495,122

[30] Foreign Application Priority Data
Sept. 6, 1973  United Kingdom............... 41889/73

[52] U.S. Cl............................. 260/249.5; 260/249.8; 260/336; 260/247.1 E; 260/250 P; 260/250 Q; 260/250 B; 260/240 B; 260/240 CA; 260/293.58; 260/256.5 R; 260/326.82; 8/54.2
[51] Int. Cl.²............... C07D 251/50; C07D 251/44
[58] Field of Search........... 260/249.5, 249.8, 240 B

[56] References Cited
UNITED STATES PATENTS
3,883,529  5/1975  Austin.............................. 260/249.5

*Primary Examiner*—John M. Ford
*Attorney, Agent, or Firm*—Cushman, Darby & Cushman

[57] ABSTRACT

Dyestuffs of the formula:

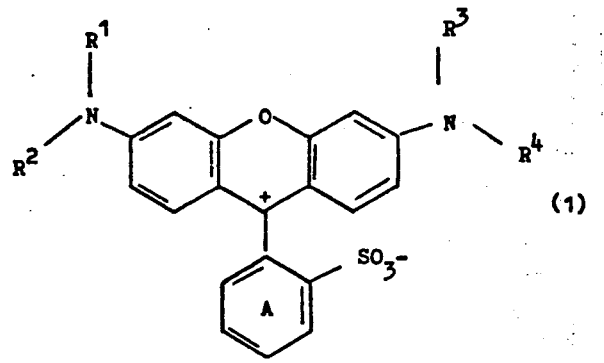

(1)

in which

R¹ is H, benzyl, sulphobenzyl or an alkyl group of 1-4 carbon atoms which may be substituted by OH, CN, $OSO_3H$, $CO_2H$, halogen, $SO_3H$ or NHQ, Q representing a cellulose-reactive group, R² is H, or an alkyl group of 1-4 carbon atoms which may be substituted by OH, CN, $OSO_3H$, $CO_2H$, halogen or $SO_3H$, or $NR^1R^2$ is the N-linked radical of a nitrogen-containing heterocyclic compound containing 5 or 6 atoms in the heterocyclic ring, R³ is H or an alkyl group of 1-4 carbon atoms which may be substituted by OH, R⁴ is benzyl which may be substituted by $SO_3H$ or NHQ, an alkyl group of 1 to 4 carbon atoms which may be substituted by OH, $SO_3H$ or NHQ or a phenyl radical which may be substituted by $SO_3H$, $CO_2H$, halogen, alkyl or alkoxy of 1 to 4 carbon atoms or NHQ, and the benzene ring A may be further substituted by an alkyl or alkoxy group of 1-4 carbon atoms, halogen, $NO_2$ or NHQ, and wherein $NR^1R^2$ and $NR^3R^4$ are different and the dyestuff as a whole contains 1 or 2 cellulose-reactive groups and at least one further $SO_3H$ group.

The dyestuffs are particularly suitable for dyeing cellulose textile materials in the presence of alkalies to give bright reddish or violet shades having good fastness to washing. The light fastness of the new dyes is much better than could have been expected from the known fastness of basic xanthene dyes applied to cellulose with the aid of mordants.

4 Claims, No Drawings

REACTIVE TRIAZINYL DYESTUFFS

This invention relates to new reactive dyestuffs and more particularly to new reactive dyestuffs of the xanthene series.

According to the invention there are provided dyestuffs of the formula:

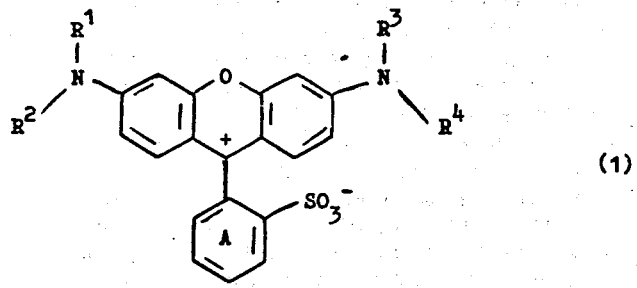

(1)

in which
- $R^1$ is H, benzyl, sulphobenzyl or an alkyl group of 1–4 carbon atoms which may be substituted by OH, CN, $OSO_3H$, $CO_2H$, halogen, $SO_3H$ or NHQ, Q representing a cellulose-reactive group,
- $R^2$ is H, or an alkyl group of 1–4 carbon atoms which may be substituted by OH, CN, $OSO_3H$, $CO_2H$, halogen or $SO_3H$, or
- $NR^1R^2$ is the N-linked radical of a nitrogen-containing heterocyclic compound containing 5 or 6 atoms in the heterocyclic ring,
- $R^3$ is H or an alkyl group of 1–4 carbon atoms which may be substituted by OH,
- $R^4$ is benzyl which may be substituted by $SO_3H$ or NHQ, an alkyl group of 1 to 4 carbon atoms which may be substituted by OH, $SO_3H$ or NHQ or a phenyl radical which may be substituted by $SO_3H$, $CO_2H$, halogen, alkyl or alkoxy of 1 to 4 carbon atoms or NHQ, and the benzene ring A may be further substituted by an alkyl or alkoxy group of 1–4 carbon atoms, halogen, $NO_2$ or NHQ, and wherein the groups $NR^1R^2$ and $NR^3R^4$ are different and the dyestuff as a whole contains 1 or 2 cellulose-reactive groups and at least one further $SO_3H$ group.

Preferably the dyestuff contains more than one further $SO_3H$ group, and depending on the meaning of $R^1$, $R^2$, $R^3$ and $R^4$ and the type of reactive group present may advantageously contain up to six sulphonic acid groups in addition to the one depicted. These sulphonic acid groups may be present in any of the radicals $R^1$, $R^2$, $R^3$ and $R^4$, or the benzene ring A, or in a cellulose-reactive group Q substituted in one of these.

As examples of alkyl or substituted alkyl groups represented by $R^1$ to $R^4$, there may be mentioned: methyl, ethyl, n-propyl, iso-propyl, n-butyl and t-butyl, β-hydroxyethyl, β-cyanoethyl, β-sulphatoethyl, β-chloroethyl, β-carboxyethyl, γ-carboxypropyl, β-carboxypropyl, β-hydroxypropyl, β-sulphoethyl, $-CH_2CH_2NHQ$ and

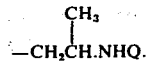

As examples of heterocyclic radicals represented by $NR^1R^2$ there may be mentioned pyrrolidinyl, piperidinyl, morpholinyl and piperazinyl in which the second nitrogen atom ($N^1$) may carry Q as a substituent.

As halogen atoms present in a phenyl nucleus $R^4$ or in the benzene ring A, there may be mentioned bromine or more especially chlorine.

A preferred class of dyestuffs are those as defined above in which $R^1$ is H or an alkyl group of 1–4 carbon atoms, $R^2$ is an alkyl group of 1–4 carbon atoms which may be substituted by $SO_3H$ or $NRR^2$ is the N-linked radical of a nitrogen containing heterocyclic compound containing 5 or 6 atoms in the heterocyclic ring, $R^3$ is H or an alkyl group of 1–4 carbon atoms which may be substituted by OH and $R^4$ is an alkyl group of 1–4 carbon atoms substituted by the group NHQ.

A further preferred class of dyestuffs are those in which $R^1$ is H or an alkyl group of 1–4 carbon atoms, $R^2$ is an alkyl group of 1–4 carbon atoms which may be substituted by $SO_3H$ or $NRR^2$ is the N-linked radical of a nitrogen containing heterocyclic compound containing 5 or 6 atoms in the heterocyclic ring, $R^3$ is H or an alkyl group of 1–4 carbon atoms which may be substituted by OH, $R^4$ is a benzyl sulphobenzyl, phenyl or sulphophenyl group and $R^4$ is substituted by the group NHQ.

By "a cellulose-reactive group" is meant a group containing an unsaturated linkage or a substituent capable of reacting with the hydroxyl groups of the cellulose molecule in the presence of an alkaline substance and attaching the dyestuff molecule by a covalent linkage.

As examples of groups represented by Q, there may be mentioned β-sulphatoethylsulphonyl, α,β-unsaturated acyl radicals of aliphatic carboxylic acids, for example acrylic acid, α-chloroacrylic acid, propiolic acid, maleic acid and mono- and di-chloromaleic acids; also the acyl radicals of acids which contain a substituent which reacts with cellulose in the presence of an alkali, e.g. the radical of a halogenated aliphatic acid such as chloroacetic acid, β-chloro- and β-bromopropionic acids and α,β-dichloro- and dibromo-propionic acids. Other examples of cellulose-reactive groups are tetrafluorocyclobutyl carbonyl, trifluorocyclobutenyl carbonyl, tetrafluorocyclobutylethenyl carbonyl, trifluorocyclobutenylethenyl carbonyl, and heterocyclic radicals which contain 2 or 3 nitrogen atoms in the heterocyclic ring and at least one cellulose-reactive substituent on a carbon atom of the ring.

As examples of such heterocyclic radicals, there may be mentioned, for example:
  2:3-dichloro-quinoxaline-5- or -6-carbonyl,
  2:4-dichloro-quinazoline-6-carbonyl,
  1:4-dichloro-phthalazine-6-carbonyl,
  4:5-dichloro-pyridazon-1-yl,
  2:4-dichloro-pyrimidine-5-carbonyl, 3-(4':5'-dichloro-pyridaz-6'-on-1'-yl)benzoyl,
5-chloro-2-methylsulphonyl-6-methyl-pyrid-4-yl,
2,4-difluoro-5-chloropyrimid-6-yl,
and more particularly s-triazin-2-yl and pyrimidin-2-yl or 4-yl radicals which contain on at least one of the remaining 2,4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

 (2)

wherein $Y^1$ represents a group of atoms necessary to form a 5- or 6-membered heterocyclic ring which may carry substituents or form part of a fused ring system; or a quaternary ammonium or pyridinium group; or a group of the formula:

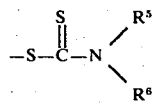 (3)

wherein $R^5$ and $R^6$ each represents the same or different alkyl, cycloalkyl, aryl or aralkyl group, or $R^5$ and $R^6$ together form, together with the nitrogen atom, a 5- or 6-membered heterocyclic ring; or a group of the formula:

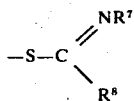 (4)

wherein $R^7$ and $R^8$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or disubstituted amino groups, etherified hydroxyl and etherified mercapto groups; in the case of substituted amino groups, this class includes, for example, mono- and di-alkylamino groups in which the alkyl groups preferably contain at most 4 carbon atoms, and which may also contain substituents for example, hydroxyl or alkoxy groups, and phenylamino and naphthylamino groups preferably containing sulphonic acid substituents; in the case of etherified hydroxyl and mercapto groups, this class includes, for example, alkoxy and alkylthio groups preferably those of low molecular weight. i.e. having up to 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β-hydroxyethyl)amino, β-chloroethylamino, cyclohexylamino, anilino, sulphosphenylamino, disulphophenylamino, N-methylsulphophenylamino, N-β-hydroxyethylsulphophenylamino, mono-, di- and tri-sulphonaphthylamino, sulpho-o-tolylamino, carboxyphenylamino and sulphocarboxyphenylamino, N-ω-sulphomethylphenylamino, methoxy, ethoxy, and butoxy, phenoxy, methylphenoxy, chlorophenoxy and phenylthio groups. Chlorine atoms or cyano, nitro, carboxy and carbalkoxy groups in the 5-position of a pyrimidyl radical come into the category of non-reactive substituents.

Alternatively the second substituent on parts of water and stirred at 0°–5°C. A solution of 1.0 parts of cyanuric chloride in 10 parts of acetate is added and the mixture stirred at radical which carries another cellulose-reactive group, e.g. an anilino or naphthylamino group carrying a β-sulphatoethyl sulphonyl group attached to a carbon atom of the ring, but more especially the radical of a diamine carrying a mono- or di-chloro-s-triazine group attached to the second with atom, i.e. a group of the formula:

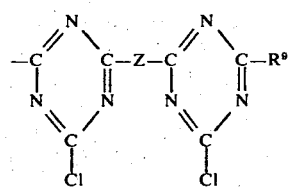 (5)

wherein Z is the N,N'-divalent radical of an aliphatic, aromatic, or heterocyclic diamine and $R^9$ represents Cl or an amino, substituted amino or etherified hydroxyl groups.

As examples of radicals represented by Z, there may be mentioned, e.g. N,N'-piperazinylene, and radicals of the formula:

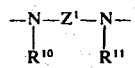 (6)

wherein $R^{10}$ and $R^{11}$ independently represent H or an alkyl or hydroxyalkyl group of up to 4 carbon atoms, e.g. methyl, ethyl, β-hydroxyethyl, n-propyl, n-butyl and γ-hydroxypropyl, and $Z^1$ is an aliphatic or aromatic radical, e.g. an alkylene, poly(alkyleneimine) or dialkyloxide radical, e.g. ethylene propylene, tri-, tetra- and hexa-methylenes, —$C_2H_4NHC_2H_4$—, —$C_2H_4(NHC_2H_4)_2$— and $C_2H_4OC_2H_4$, or a divalent radical of the benzene or naphthalene series which preferably contains 1 or 2 sulphonic acid groups, e.g. a disulphonaphthylene radical, or a divalent radical of the stilbene, diphenyloxide, diphenylmethane, diphenylurea, diphenoxyethane or diphenylamine series which preferably contains 1 or 2 sulphonic acid groups, or more especially a mono- or di-sulphophenylene.

A special class of the new dyestuffs are those in which the reactive group takes the form of formula (5), the radical $R^9$ being a second xanthene residue conforming to the general definition of formula (1).

Thus, a preferred group of s-triazine radicals are those in which Q represents a group of the formula

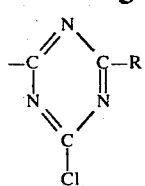

or

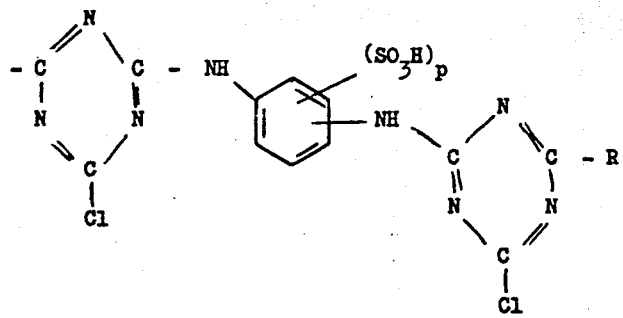

where *p* is 1 or 2, and R is Cl, alkoxy of 1–4 carbon atoms, phenoxy, sulphophenoxy, $NH_2$, alkylamino, dialkylamino, hydroxyalkylamino, di(hydroxyalkyl)amino,

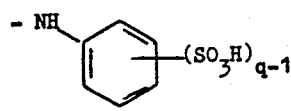

(9)

or 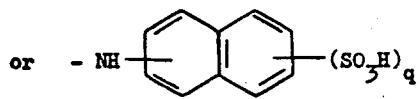

(10)

where $q = 1, 2$ or $3$,

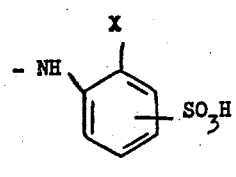

(11)

where X is $CH_3$, $OCH_3$, Cl or $CO_2H$,

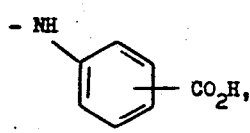

(12)

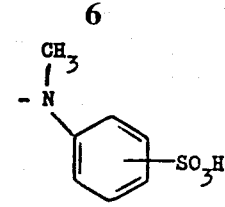

(13)

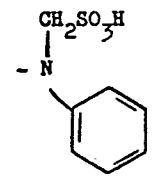

or (14)

The new dyestuffs can be obtained by condensing an amino compound of the formula:

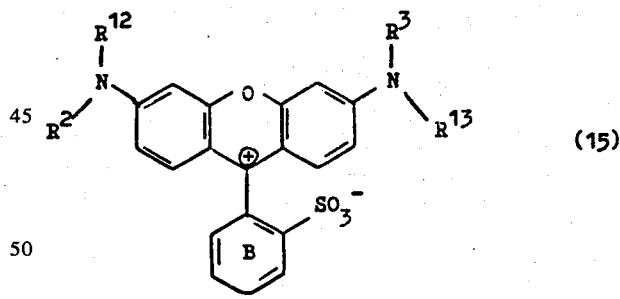

(15)

wherein $R^2$ and $R^3$ have the meanings stated above,
$R^{12}$ is H, benzyl, sulphobenzyl or an alkyl group of 1 to 4 carbon atoms which may be substituted by OH, CN, $OSO_3H$, $CO_2H$, halogen, $SO_3H$ or $NH_2$; or $NR^2R^{12}$ is the N-linked radical of a nitrogen-containing heterocyclic compound containing 5 or 6 atoms in the heterocyclic ring;
$R^{13}$ is benzyl which may be substituted by $SO_3H$ or $NH_2$, an alkyl group of 1-4 carbon atoms which may be substituted by OH, $SO_3H$ or $NH_2$, or a phenyl radical which may be substituted by $SO_3H$, $CO_2H$, halogen, alkyl or alkoxy of 1-4 carbon atoms or $NH_2$; and the benzene ring B may be further substituted by an alkyl or alkoxy group of 1-4 carbon atoms, halogen, $NO_2$ or $NH_2$, and wherein the groups $NR^2R^{12}$ and $NR^3R^{13}$ are different and the compound contains 1 or 2 amino groups, with the anhydride or the acid chloride of a carboxylic or sulphonic acid which contains a cellulose-reactive substituent or with a heterocyclic compound which contains a halogen atom and at least one cellulose-reactive substituent attached to carbon atoms of the ring, the reactants together containing at least one additional $SO_3H$ group.

The above process can conveniently be carried out by stirring the reactants in an aqueous medium, optionally in the presence of a water-soluble organic solvent, at a temperature within the range 0°–100°C, and preferably maintained at a pH of from 5–8.

As examples of acid chlorides, acid anhydrides or heterocyclic compounds which may be used, there may be mentioned, for example, carbyl sulphate, acid halides of $\alpha,\beta$-unsaturated aliphatic acids such as
chloromaleic anhydride,
propiolyl chloride,
acryloyl chloride,
the acid chlorides of halogenated aliphatic acids such as
chloroacetyl chloride,
sulphochloroacetyl chloride,
$\beta$-bromo- and $\beta$-chloro-propionyl chloride,
$\alpha{:}\beta$-dichloro- and dibromo-propionyl chlorides,
2,2,3,3-tetrafluorocyclobutyl carbonyl chloride,
$\beta$-(2,2,3,3-tetrafluorocyclobutyl)acryloyl chloride,
2,3,3-trifluorocyclobut-1-enyl carbonyl chloride,
$\beta$-(2,3,3-trifluorocyclobut-1-enyl)acryloyl chloride,
and heterocyclic compounds which contain at least 2 nitrogen atoms in the heterocyclic rings and which contain two or more halogen, especially chlorine atoms in the ortho positions to the nitrogen atoms, such as
2:3-dichloro-quinoxaline-5- and -6-carbonyl chlorides,
2:4-dichloro-quinazoline-6-carbonyl chloride,
1:4-dichloro-phthalazin-6-carbonyl chloride,
2:4-dichloro-pyrimidine-5-carbonyl chloride,
$\beta$-(4:5-dichloro-pyridazonyl-1-)propionyl chloride,
1-(4'-chlorocarbonylphenyl)-4:5-dichloro-6-pyridazone,
2:4:6-tribromo- and trichloro-pyrimidines,
2:4:5:6-tetrachloropyrimidine,
5-methyl-2:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloro-pyrimidine
2:4-dichloropyrimidine-5-carbonyl chloride,
4,5-dichloro-2-methylsulphonyl-6-methylpyrimidine,
2,4,6-trifluoro-5-chloropyrimidine,
cyanuric bromide,
cyanuric chloride;
the primary condensation products of cyanuric bromide or cyanuric chloride with ammonia, an alkali metal sulphite or thiocyanate or an organic mercaptan, hydroxy compound or an organic primary or secondary amine, for example:
methanol,
ethanol,
iso-propanol,
phenol,
o-, m- and p-chlorophenols,
o-, m- and p-cresols,
o-, m- and p-sulphophenols,
thiophenol,
thioglycollic acid,
dimethyldithiocarbamic acid,
mercaptobenzthiazole,
thioacetamide,
methylamine,
dimethylamine,
ethylamine,
diethylamine,
n-propylamine,
iso-propylamine,
butylamines,
hexyl- and cyclohexylamines,
toluidines,
piperidine,
morpholine,
methoxyethylamine,
ethanolamine,
diethanolamine,
aminoacetic acid,
aniline-2,4-, 2,5- and 3,5-disulphonic acids,
orthanilic, metanilic and sulphanilic acids,
2-, 3- and 4-aminobenzoic acids,
4- and 5-sulpho-2-aminobenzoic acids,
4- and 5-sulpho-o-toluidines,
N-methyl metanilic acid,
$\omega$-sulphomethylaniline,
amino-naphthalene mono-, di- and tri-sulphonic acids
and $\beta$-amino- and N-methylamino-ethanesulphonic acid;
also the secondary condensation products of cyanuric chloride with alkali metal sulphites, alkali metal thiocyanates, phenols and thiophenols containing an electronegative substituent, and compounds of the formulae:

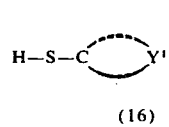   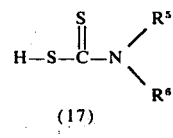

(16)   (17)

and

   (18)

wherein $Y^1$, $R^5$, $R^6$, $R^7$ and $R^8$ have the meanings stated above.

For introducing by this process a reactive group of the kind described by formula (5), the compound of formula (15) is reacted with a N,N'-bis-(chloro-s-triazinyl)diamine in which at least one of the chloro-s-triazine groups contains two chlorine atoms e.g. the reaction product of an aliphatic, aromatic or heterocyclic diamine with two moles of cyanuric chloride, or with 1 mole of cyanuric chloride and 1 mole of the primary condensation product of cyanuric chloride and ammonia, a primary or secondary amine or an alcohol or phenol, of the kinds illustrated earlier.

As examples of diamines which may be used in this connection there may be mentioned heterocyclic diamines, e.g. piperazine, aliphatic diamines e.g. alkylene-, hydroxyalkylene- or sulphatoalkylenediamines, e.g.
ethylene diamine, propylene diamine,
1,3-diaminopropane,
β-hydroxyethylaminoethylamine,
2-hydroxy-1,3-diaminopropane,
2-sulphato-1-3-diaminopropane,
naphthylene diamine sulphonic acids, e.g.
2,6-diaminonaphthalene-1,5- and 4,8-disulphonic acids,
1,5-diaminonaphthalene-3,7-disulphonic acid
and diamine derivatives of mono- and di-cyclic compounds of the benzene series, e.g.
m- and p-phenylenediamines,
1,3-phenylenediamine-4-sulphonic and 4,6-disulphonic acids,
1,4-phenylenediamine-2-sulphonic and 2,5-disulphonic acids,
4,4'-diaminostilbene-2,2'-disulphonic acid,
benzidine-2,2'-disulphonic acid,
3,3'- and 4,4'-diaminodiphenylureas,
4,4'-diaminodiphenylurea-2,2'- and 3,3'-disulphonic acids,
4,4'-diaminodiphenylmethane,
4,4'-diaminodiphenoxyethane-2,2'-disulphonic acid,
4,4'-diaminodiphenyl sulphone,
4-methylaminoaniline-2-sulphonic acid.

When reacting with a bis-(dichloro-s-triazinyl)diamine, the final dyestuff obtained depends upon the proportions reacted; using equimolar proportions, the dyestuff obtained contains a single xanthene residue and a reactive group of formula (5) in which R represents a chlorine atom; on the other hand, by using two moles of the compound of formula (15) for each mole of the bis-(dichloro-s-triazinyl)diamine, the dyestuff obtained contains two xanthene residues linked together by the bis-(chloro-s-triazinyl)diamine residue.

The dyestuffs in which two xanthene residues are linked by a bis(chloro-s-triazinyl)diamine residue may also be obtained by reacting 2 moles of cyanuric chloride in either order with 1 mol of a diamine and 2 moles of an aminoxanthene compound as defined in formula (15) and containing one NH₂ group per molecule.

The compounds of formula (15) can be obtained, in general, by reacting one mole of a compound of the formula:

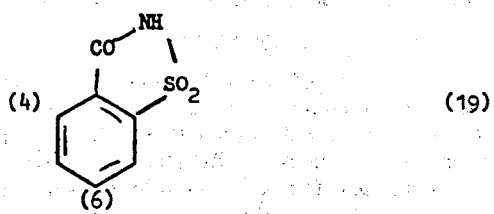

wherein the benzene ring may be substituted, especially in the 4- or 6-position, by an alkyl or alkoxy group of 1-4 carbon atoms, halogen or NO₂, with two moles of resorcinol, treating the product with POCl₃ to form the corresponding 3,6-dichloroxanthene compound and reacting this in a stepwise manner with one mole of an amine NHR²R¹² and one mole of an amine NHR³R¹³; in the case that an amino group is present in the benzene ring B of formula (15) this is formed by forming the corresponding nitro compound by the steps just described and treating this with a reducing agent to convert the nitro group to amino.

As examples of compounds of formula (19) which may be used, there may be mentioned:

2-sulphobenzoic acid imide ("saccharin")
6-chlorosaccharin,
6-bromosaccharin,
6-nitrosaccharin,
4-methoxysaccharin,
6-methoxysaccharin,
4-nitrosaccharin,
4-methylsaccharin and
6-methylsaccharin.

The amines used for this purpose may be divided into three classes a. compounds falling only into the definition of NHR²R¹², i.e. ammonia, compounds having a 5- or 6-membered heterocyclic ring containing a NH- group, e.g. pyrrolidine, piperidine, morpholino or piperazine, and alkylamines, dialkylamines or N-alkylbenzylamines in which the alkyl group or one or both of the alkyl groups is substituted by CN, OSO₃H, CO₂H or halogen, e.g.:
β-cyanoethylamine,
β-aminoethylsulphate,
alanine and β-alanine,
β-chloroethylamine,
β-(β'-cyanoethylamino)ethylsulphate,
N-(β'-sulphatoethyl)-β-alanine,
N-(β-cyanoethyl)benzylamine,
N-(β-sulphatoethyl)-m-sulphobenzylamine,
N-(β-carboxyethyl)benzylamine,
β-cyanodiethylamine,
β-(methylamino)ethyl sulphate,
N-(hydroxyethyl)-β-alanine,
β-chloroethylpropylamine,
di-(β-sulphatoethyl)amine,
di-β-cyanoethylamine, and
β- and γ-aminobutyric acids.

b. compounds falling only into the definition of NHR³R¹³, i.e. where R¹³ is a phenyl or substituted phenyl radical, e.g. aniline, N-methylaniline, N-ethylaniline, N-β-hydroxyethylaniline, o-, m- and p-toluidines, o-, m- and p-aminobenzoic acids, o-, m- and p-chloroanilines, o-, m- and p-anisidines, m- and p-phenylenediamines and the monosulphonic acid derivatives of these, e.g. orthanilic metanilic and sulphanilic acids, 1,3-phenylenediamine-4-sulphonic acid and 1,4-phenylenediamine-2-sulphonic acid.

c. compound which fall into both definitions of NHR²R¹² and NHR³R¹³, i.e. alkyl- and dialkyl-amines in which the alkyl groups contain 1-4 carbon atoms, in which one alkyl group may be substituted by SO₃H or NH₂ and either or both may be substituted by OH, benzylamine, sulphobenzylamines and their N-alkyl or N-hydroxyalkyl derivatives, e.g. methylamine, dimethylamine, ethylamine, diethylamine, isopropylamine, n- and t-butylamines, methylethylamine, ethyl-t-butylamine, ethanolamine, diethanolamine, isopropanolamine, N-ethylethanolamine, taurine, N-methyl- and N-ethyl-taurines, ethylene diamine, propylene diamine, trimethylene diamine, N-methyl- and N-ethyl-benzylamines, N-(β-hydroxyethyl)benzylamine and m- and p-sulphobenzylamines.

The dyes of formula (1) in which Q is a group of formula (5) can also be obtained by condensing a diamine, in either order, with one mole of the reaction product of cyanuric chloride and a compound of formula (15) and with one mole of a triazine of the formula:

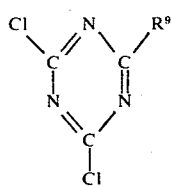

The dyes in which Q represents a group of formula (5) or a group of formula (7) in which $R^9$ or R respectively, represent an amino or substituted amino group can also be obtained by condensing the corresponding dyestuff in which R or $R^9$ represents a chlorine atomm with ammonia or an amine.

These processes can conveniently be carried out by stirring the reactants in an aqueous medium, optionally in the presence of a water-soluble organic solvent. Except in the case where the triazine of formula (20) is cyanuric chloride, when a temperature of 0-10°C is preferable, the condensations can be carried out at a temperature of from 30 to 60°C, preferably maintaining the pH at from 5 to 8 by adding an acid-binding agent to neutralize the hydrogen chloride formed during the reaction. Suitable acid-binding agents are alkali metal hydroxides, carbonates and bicarbonates, or an excess of ammonia or aliphatic amine where this is one of the reactants.

The cellulose-reactive dyes of formula (1) wherein the cellulose-reactive group is a s-triazine nucleus substituted by $SO_3H$, a quaternary ammonium group or a group of formulae (2). (3) and (4), can be obtained in a similar manner by reacting a cellulose-reactive dye of formula (1) containing a s-triazine group substituted by at least one chlorine or bromine atom with an alkali metal salt of sulphurous acid, a tertiary amine or a compound of formulae (16), (17) and (18).

The new dyestuffs can be used for coloring a variety of materials, e.g. natural and synthetic polyamide materials, e.g. wool and nylon, but more particularly natural or artifical cellulose materials, e.g. cotton, linen and viscose rayon, which they dye or print in the presence of alkali to give bright reddish to violet shades of high tinctorial value having good fastness to washing treatments and a fastness to light which is much better than could have been expected from the known fastness of cellulose dyed with basic xanthene dyes with the aid of mordants.

The invention is illustrated by the following Examples in which parts and percentages are by weight.

EXAMPLE 1

A mixture of 4.05 parts of 3,6-dichloroxanthlium-9-phenyl-2'-sulphonic acid and 1.88 parts of 1,3-phenylenediamine-4-sulphonic acid in 100 parts of water and 100 parts of ethyl alcohol is stirred at 80°C for 30 minutes. The pH of the solution is then adjusted to 7.0 by addition of 2N sodium carbonate solution as required. A solution of 3.5 parts of the sodium salt of N-methyltaurine is then added and the mixture is stirred at 80°C for 2 hours.

The solution is cooled to 20°C, screened and the product precipitated by acidification with hydrochloric acid and addition of potassium chloride.

A solution of 7.4 parts of the product so obtained in 200 parts of water is stirred at 45°-50°C for 3 hours with the primary condensation product of 1.85 parts of cyanuric chloride and 1.75 parts of metanilic acid, keeping the pH at 6-7 by addition of 2N sodium carbonate solution as required. The solution is cooled and diluted with 600 parts of acetone. The precipitated dye is filtered off and dried at 40°C.

When applied to cellulosic fibres in the presence of an acid binding agent it gives bright violet shades with good fastness to washing.

In place of the condensation product of metanilic acid and cyanuric chloride used in the above Example there may be used an equivalent amount of the condensation product of cyanuric chloride with any of the following, when dyes similar in shade and fastness properties are obtained.

EXAMPLE 2 sulphanilic acid
3 2-aminotoluene-4-sulphonic acid
4 2-aminotoluene-5-sulphonic acid
5 aniline-2,5-disulphonic acid.

EXAMPLE 6

A mixture of 4.05 parts of 3,6-dichloroxanthylium-9-phenyl-2'-sulphonic acid and 1.4 parts of N-methyltaurine is stirred at 20°C for 30 minutes with 50 parts of water and 50 parts ethyl alcohol. The solution is screened and 2.1 parts of N-β-hydroxyethylethylenediamine are added to the filtrate. This mixture is then boiled under a reflux condenser for 1½ hours. The solution is cooled and screened. The filtrates are diluted with 1000 parts of acetone and the precipitated product separated from the liquors and dried.

A solution of 5.3 parts of the product obtained above is stirred in 150 parts of water at 45°-50°C for 2 hours with the primary condensation product of 1.85 parts of cyanuric chloride and 1.75 parts of metanilic acid, keeping the pH at 9-9.5 by addition of 2N sodium carbonate solution as required. The solution is then cooled to 20°C and the pH adjusted to 7.0 by addition of 2N hydrochloric acid solution. The solution is then diluted with 1500 parts of acetone. The precipitated dyestuff is separated and dried at 40°C.

When applied to cellulosic textile materials in the presence of an acid binding agent it gives brilliant fluorescent pink shades with good fastness to washing.

EXAMPLE 7

A mixture of 4.05 parts of 3,6-dichloroxanthylium-9-phenyl-2'-sulphonic acid and 1.88 parts of 1,4-phenylenediamine-3-sulphonic acid in 100 parts of water and 100 parts of ethyl alcohol is stirred at 80°C for 30 minutes. The pH of the solution is then adjusted to 7.0 by addition of 2N sodium carbonate solution as required. A solution of 3.5 parts of the sodium salt of N-methyltaurine is then added and the mixture is stirred at 80°C for 2 hours. The solution is cooled to 20°C and diluted with 500 parts of ethyl alcohol. The precipitated product is filtered off and dried at 40°C.

A solution of 7.4 parts of the product obtained above is stirred in 200 parts of water at pH 7.0 and 0°-5°C. A solution of 1.85 parts of cyanuric chloride in 20 parts of acetone is added and the mixture is stirred at 0°-5°C for 1½ hours maintaining the pH at 6-7 by addition of 2N sodium carbonate solution as required. The solution is screened and the filtrates salted to 20% weight/volume by addition of sodium chloride. The dyestuff is collected by filtration, mixed intimately with 1 part of potassium dihydrogen phosphate and 0.5 parts of disodium hydrogen phosphate and dried in vacuo.

The product, of possible formula:

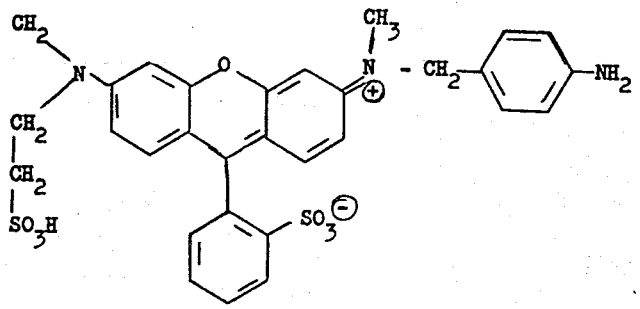

The dyestuff dyes cellulosic fibres in blue/violet shades when applied in the presence of an acid binding agent and has good fastness to washing.

EXAMPLE 8

A solution of 12.4 parts of 3,6-dichloroxanthylium-9-phenyl-2'-sulphonic acid in 200 parts of water and 200 parts of ethyl alcohol is stirred at 80°C. A solution of 7.0 parts of 4-nitro-N-methylbenzylamine in 100 parts of ethyl alcohol at 60°C is added and the mixture stirred at the boil for 1 hour in an open beaker. 300 parts of ice are added and the mixture allowed to stand for 2 hours. The precipitated monocondensation product is filtered off and washed with cold water.

A solution of 10.7 parts of the monocondensation product prepared above in 200 parts of ethyl alcohol is boiled under a reflux condenser. A solution of 3.0 parts of N-methyltaurine is added and the mixture boiled under a reflux condenser for 1 hour. The mixture is then cooled and the liquors decanted from the residue. The residue is then dissolved in 100 parts of water and 5 parts of a catalyst containing 3% palladium on charcoal is added. The mixture is agitated in an atmosphere of hydrogen at room temperature and a slight excess pressure until the rapid uptake of hydrogen has ceased. The mixture is screened and the filtrate salted to 20% w/v with potassium chloride and filtered.

is dissolved in 200 parts of water and stirred at 0°–5°C for 1 hour maintaining the pH at 6–7 by simultaneous addition of 2N sodium carbonate solution as required. The solution is screened and the filtrates salted 20% w/v withh sodium chloride. The dyestuff is collected by filtration, mixed intimately with 1 part of potassium dihydrogen phosphate and 0.5 parts of disodium hydrogen phosphate and dried in vacuo.

The dyestuff dyes cellulosic fibres in brilliant bluish red shades when applied in the presence of an acid binding agent with good fastness to washing.

Further examples of the dyestuffs prepared by the methods of Examples 1 to 8 are found in the Table, when 3,6-dichloroxanthylium-9-phenyl-2'-sulphonate is first condensed with the amine in Column II, and this monocondensation product is then condensed with the amine in Column III. When one of the amines in Columns II and III is a diamine the secondary condensation product is acylated directly with the acylating agent described in Column IV and the shade on cellulose is given in Table V. In the Examples, where the amine in Column II contains a nitro group this nitro group is reduced to an amino group prior to being acylated with the acylating agent described in Table V, and the shade obtained when the dye is applied to cellulose is described in Column V. In Column IV the symbol (dct) represents "-2,4-dichloro-s-triazine".

| I. Example | II. Amine | III Amine | IV Acylating Agent | V. Shade on Cellulose |
|---|---|---|---|---|
| 9 | 1,3-phenylenediamine-4-sulphonic acid | taurine | 6(4,8-disulphonaph-2-ylamino)-(dct) | Reddish-violet |
| 10 | '' | diethanolamine | 6(2,5-disulphoanilino)-(dct) | '' |
| 11 | '' | diethylamine | 6(3,5-disulphoanilino)-(dct) | '' |
| 12 | '' | morpholine | 6(3,6,8-trisulphonaphth-2-ylamino)-(dct) | '' |
| 13 | '' | N,N-bis-cyanoethylamine | 6(2-carboxy-4-sulphoanilino)-(dct) | '' |
| 14 | '' | N-ethyltaurine | 6(4-carboxyanilino)-(dct) | '' |
| 15 | '' | benzylamine | 6(3,8-disulphonaphth-1-ylamino)-(dct) | Bluish-violet |
| 16 | '' | N-methyltaurine | 6(N-ω-sulphomethylanilino)-(dct) | Reddish-violet |
| 17 | '' | '' | 6(4'-β-sulphatoethylsulphonyl anilino)-(dct) | '' |
| 18 | 1,4-phenylenediamine-2-sulphonic acid | '' | 2,3-dichloroquinoxaline-6-carbonyl chloride | Bluish-violet |
| 19 | '' | '' | 2,3-dichloroquinoxaline-5-sulphonyl chloride | '' |
| 20 | '' | '' | 2,4-dichloroquinazoline-7-sulphonyl chloride | '' |
| 21 | '' | '' | 2,4-dichloroquinazoline-6-carbonyl chloride | '' |
| 22 | '' | '' | 3,6-dichloropyridazine-4-carbonyl chloride | '' |
| 23 | '' | '' | 4,5-dichlor-6-methyl-2-methyl sulphonyl pyrimidine | '' |
| 24 | '' | '' | 2,4,6-trichloropyrimidine | '' |
| 25 | '' | '' | 2,4,5,6-tetrachloropyrimidine | '' |
| 26 | '' | '' | 2,4,6-trifluor-5-chloropyrimidine | '' |

-continued

| I. Example | II. Amine | III Amine | IV Acylating Agent | V. Shade on Cellulose |
|---|---|---|---|---|
| 27 | " | " | 5-cyano-2,4,6-trichloropyrimidine | " |
| 28 | " | " | 5-bromo-2,4,6-trichloropyrimidine | " |
| 29 | " | " | 2,4,6-tribromopyrimidine | " |
| 30 | " | " | cyanuric bromide | " |
| 31 | " | " | β-chloroethylsulphonyl-endomethylene-cyclohexane carbonyl chloride | " |
| 32 | " | " | 2,2,3,3-tetrafluorocyclobutane carbonyl chloride | " |
| 33 | " | " | 2,3,3-trifluorocyclobut-1-enecarbonyl chloride | " |
| 34 | " | " | β-(2',2',3',3'-tetrafluorocyclobutyl)acryloyl chloride | " |
| 35 | " | " | β-(2',3',3'-trifluorocyclobut-1-enyl)acryloyl chloride | " |
| 36 | " | " | β-(4,5-dichloro-pyridazonyl-1-)propionyl chloride | " |
| 37 | " | " | 1-(4'-chlorocarbonylphenyl)-4:5-dichloro-6-pyridazone | " |
| 38 | " | " | 1-(4'-chlorosulphonylphenyl)-4:5-dichloro-6-pyridazone | " |
| 39 | N-methyltaurine | N-β-hydroxyethyl ethylene diamine | cyanuric chloride | Brilliant pink |
| 40 | " | " | 2,4,6-trifluor-5-chloropyrimidine | " |
| 41 | " | " | 6-(4'-sulphoanilino)-(dct) | " |
| 42 | " | " | 6-(2'-methyl-4-sulphoanilino)-(dct) | " |
| 43 | " | " | 6-(2-methyl-5-sulphoanilino)-(dct) | " |
| 44 | " | " | 6-amino-(dct) | " |
| 45 | orthanilic acid | ethylenediamine | " | Bright red |
| 46 | 4-methyl-2-sulpho aniline | " | 6-(4'-sulphophenoxy)-(dct) | " |
| 47 | N-methyl-taurine | " | " | Brilliant pink |
| 48 | " | " | 6-(3'-sulphoanilino)-(dct) | " |
| 49 | " | " | 6-(4'-sulphoanilino)-(dct) | " |
| 50 | " | " | 6-(2'-sulphoanilino)-(dct) | " |
| 51 | " | " | 6-(2',5-disulphoanilino)-(dct) | " |
| 52 | " | " | 6-N-methylamino-(dct) | " |
| 53 | " | " | 6-N,N-diethylamino-(dct) | " |
| 54 | N-β-hydroxyethyl ethylenediamine | N-methyltaurine | 6-methoxy-(dct) | " |
| 55 | 4-nitro-N-methyl benzylamino | " | 2,4,6-trifluor-5-chloropyrimidine | Brilliant bluish-red |
| 56 | " | " | 5-cyano-2,4,6-trichloropyrimidine | " |
| 57 | " | " | 6-(3'-sulphoanilino)-(dct) | " |
| 58 | " | " | 6-(4'-sulphoanilino)-(dct) | " |
| 59 | " | " | 6(2'5-disulphoanilino)-(dct) | " |
| 60 | " | " | 6(2'-methyl-5'-sulphoanilino)-(dct) | " |
| 61 | " | " | 6(2-methyl-4'-sulphoanilino)-(dct) | " |
| 62 | 3-nitro-N-β-hydroxy ethylbenzylamine | " | " | " |
| 63 | 3-nitro-N-β-ethyl benzylamine | " | 6(4'-carboxyanilino)-(dct) | " |
| 64 | 4-nitrophenylethyl amine | " | " | " |
| 65 | 4-nitro-N-ethyl benzylamine | " | " | " |
| 66 | " | " | 6-isopropoxy-(dct) | " |
| 67 | " | " | 6-(3'-sulpho-N-methylanilino)-(dct) | " |
| 68 | " | " | 6-(3'-β-sulphatoethylsulphonyl anilino)-(dct) | " |
| 69 | 4-nitrophenyl ethylamine | " | 6-(3'-sulpho-N-methylanilino)-(dct) | Brilliant Red |
| 70 | piperazine | " | 6-(2,5-disulphoanilino)-(dct) | Brilliant bluish-red |
| 71 | β-alanine | 1,2-dimethylaminoethane | " | Brilliant pink |

EXAMPLES 72-79

In place of the 3,6-dichloroxanthilium-9-phenyl-2'-sulphonic acid used in Example 1 there may be used an equivalent amount of

| Example 72 | 3,4',6-trichloroxanthilium-9-phenyl-2'-sulphonate |
| Example 73 | 3,6-dichloroxanthilium-9-phenyl-4'-bromo-2'-sulphonate |
| Example 74 | 3,6-dichloroxanthilium-9-phenyl-4'-nitro-2'-sulphonate |
| Example 75 | 3,6-dichloroxanthilium-9-phenyl-6'-methoxy-2'-sulphonate |
| Example 76 | 3,6-dichloroxanthilium-9-phenyl-4'-methoxy-2'-sulphonate |
| Example 77 | 3,6-dichloroxanthilium-9-phenyl-6'-nitro-2'-sulphonate |
| Example 78 | 3,6-dichloroxanthilium-9-phenyl-6'-methyl-2'-sulphonate |
| Example 79 | 3,6-dichloroxanthilium-9-phenyl-4'-methyl-2'-sulphonate | when dyes similar in shade and properties to those described in Example 1 are obtained.

EXAMPLE 80

A solution of 7.6 parts of the dichlorotriazinyl dyestuff prepared in Example 8 is stirred in 300 parts of water at pH 7.0. A solution of 1.7 parts of benzidine-2,2'-disulphonic acid in 50 parts of water is added and the mixture heated to 40°–45°C for 5 hours, maintaining the pH at 6–7 by addition of 2N sodium carbonate solution as required. The solution is then cooled and the product isolated by precipitation with salt, filtered and dried.

When applied to cellulose textile materials in the presence of an acid binding agent it gives brilliant bluish red shades with good fastness to washing.

EXAMPLES 81–86

In place of the 1.7 parts of benzidine-2,2'-disulphonic acid used in Example 80 there may be used an equivalent amount of

| Example 81 | 4,4'-diaminostilbene-2,2'-disulphonic acid |
| Example 82 | 4,4'-diaminodiphenylurea-2,2'-disulphonic acid |
| Example 83 | 4,4'-diaminodiphenoxyethane-2,2'-disulphonic acid |
| Example 84 | 1,3-phenylenediamine-4-sulphonic acid |
| Example 85 | 2,6-diaminonaphthalene-4,8-disulphonic acid |
| Example 86 | 4,4'-diaminodibenzyl-2,2'-disulphonic acid | when dyes similar in shade and properties to those described in Example 80 are obtained.

EXAMPLE 87

A solution of 7.6 parts of the dichlorotriazinyl dyestuff prepared in Example 8 is stirred in 300 parts of water at 20°C and pH 7.0. A solution of 1.9 parts 1,3-phenylenediamine-4-sulphonic acid in 50 parts of water is added and the mixture is stirred at 40°–45°C for 2 hours maintaining the pH at 6–7 by addition of 2N sodium carbonate solution as required. The solution is then cooled to 0°–5°C and a solution of 1.9 parts of cyanuric chloride in 25 parts of acetone is added and the mixture stirred at 0°–5°C for 3 hours maintaining the pH at 6-7 by addition of 2N sodium carbonate solution. A solution of 2.5 parts of ammonium hydroxide in 10 parts of water is added and the mixture stirred at 40° for 5 hours. The solution is cooled at 20°C and the dyestuff precipitated by addition of sodium chloride, filtered and dried.

When applied to cellulose textile materials it gives brilliant bluish-red shades with good fastness to washing.

EXAMPLE 88

In place of the 1,3-phenylenediamine-4-sulphonic acid used in Example 87 there may be used an equivalent amount of 1,4-phenylenediamine-2-sulphonic acid when a dyestuff similar in shade and properties is obtained.

EXAMPLE 89

A solution of 7.95 parts of the dichlorotriazinyl dyestuff prepared in Example 7 is stirred in 200 parts of water at 20°C and pH 7.0. A solution of 1.4 parts of metanilic acid in 50 parts of water is added and the mixture stirred at 40°–45°C for 3 hours maintaining the pH of 6–7 by addition of 2N sodium carbonate solution as required. The solution is cooled, the dyestuff precipitated by addition of potassium chloride, filtered and dried.

When applied to cellulose textile materials it gives blue/violet shades with good fastness to washing.

EXAMPLES 90–95

In place of the 1.4 parts of metanilic acid used in

| Example 90 | sulphanilic acid |
| Example 91 | 2-aminotoluene-4-sulphonic acid |
| Example 92 | 2-aminotoluene-5-sulphonic acid |
| Example 93 | 4-aminobenzoic acid |
| Example 94 | 2-naphthylamine-4,8-disulphonic acid |
| Example 95 | N-methylmetanilic acid | when dyestuffs similar in shade and properties to those described in Example 89 are obtained.

EXAMPLE 96

A solution of 9.05 parts of the dyestuff prepared as described in Example 93 is stirred in 250 parts of water at 60°C. To this solution is added 3 parts of pyridine and 2 parts of sodium sulphite. The solution is stirred at 60°C until sulphiting is complete as judged by estimation of liberated sodium chloride. The solution is evaporated to dryness at 40°C under vacuum.

When applied to cellulose textile materials it gives blue/violet shades with good fastness to washing.

EXAMPLE 97

A solution of 11.0 parts of the dyestuff prepared as described in Example 94 is stirred in 300 parts of water at 20°C. A solution of trimethylamine in 10 parts of water is added and the mixture stirred at 20°C for 30 minutes. The dyestuff is precipitated by addition of salt, filtered and dried. When applied to cellulose textile materials it gives blue/violet shades with good fastness to washing.

We claim:
1. A dystuff of the formula

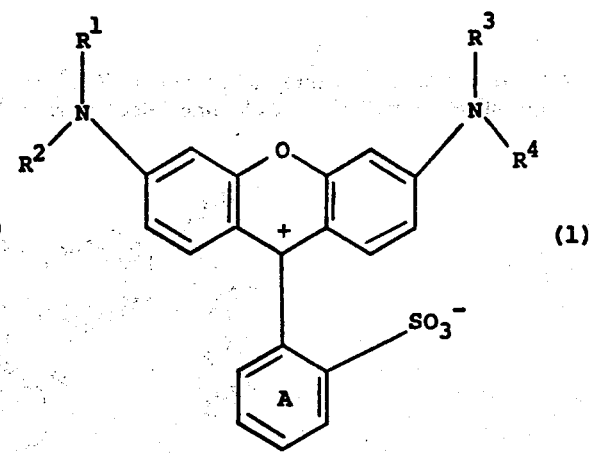

(1)

wherein
R¹ is H, benzyl, sulphobenzyl or alkyl containing 1-4 carbon atoms which can be substituted by OH, CN, OSO₃H, CO₂H, halogen, SO₃H or NHQ wherein Q represents a cellulose-reactive group of the triazine series having the formula

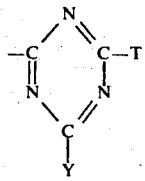

wherein
Y is halogen,
T is halogen; NH₂; alkoxy having 1-4 carbon atoms; alkylamino wherein the alkyl moiety has 1-4 carbon atoms; dialkylamino wherein each of the alkyl moieties has 1-4 carbon atoms; N-ω-sulphomethylanilino; naphthylamino substituted by 1 to 3 SO₃H groups;

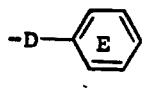

wherein
D is —O—, —NH— or —NCH₃— and the phenyl ring E is substituted by 0-2 substituents selected from SO₃H, CO₂H, CH₃, OCH₃, Cl and sulphatoethylsulphonyl; and

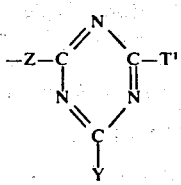

wherein Y has the meaning given above, Z is the N,N'-divalent radical of a diamine selected from 1,3-phenylene diamine-4-sulphonic acid, 1,4-phenylene diamine-2-sulphonic acid, benzidine-2,2'-disulphonic acid, 4,4'-diaminostilbene-2,2'-disulphonic acid, 4,4'-diaminodiphenylurea-2,2'-disulphonic acid, 4,4'-diaminodiphenoxyethane-2,2'-disulphonic acid, 4,4'-diaminodibenzyl-2,2'-disulphonic acid and 2,6-diaminonaphthalene-4,8-disulphonic acid, and R¹ is selected from T wherein T has the meaning given above or an amino xanthene radical as defined above by formula (1) having —NH in place of NHQ, R² is H, or alkyl containing 1-4 carbon atoms which can be substituted by OH, CN, OSO₃H, CO₂H, halogen or SO₃H, R³ is H or alkyl containing 1-4 carbon atoms which can be substituted by OH and R⁴ is benzyl which can be substituted by SO₃H or NHQ wherein Q has the meaning given above; alkyl containing 1-4 carbon atoms which can be substituted by OH, SO₃H or NHQ wherein Q has the meaning given above; or phenyl which can be substituted by SO₃H, CO₂H, halogen, alkyl having 1-4 carbon atoms, alkoxy having 1-4 carbon atoms or NHQ wherein Q has the meaning given above, the benzene ring A can be further substituted by alkyl having 1-4 carbon atoms, alkoxy having 1-4 carbon atoms, halogen, NO₂ or NHQ wherein Q has the meaning given above, and wherein NR¹R² and NR³R⁴ are different and the dyestuff as a whole contains 1 or 2 cellulose reactive groups as defined by Q above and at least one further SO₃ group in addition to the one shown in its ionized state on benzene ring A in formula (1) above.

2. A dyestuff as claimed in claim 1 having the formula:

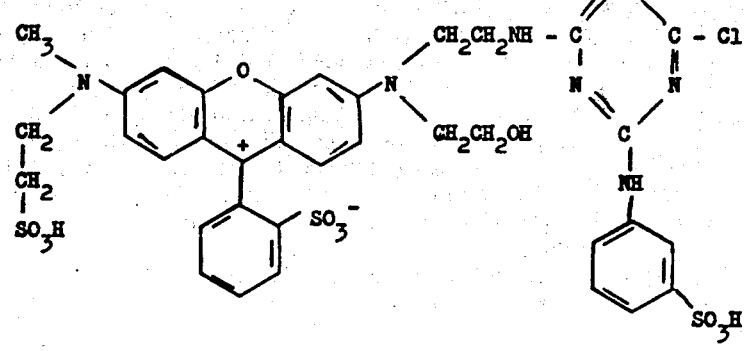

3. A dyestuff as claimed in claim 1 having the formula:

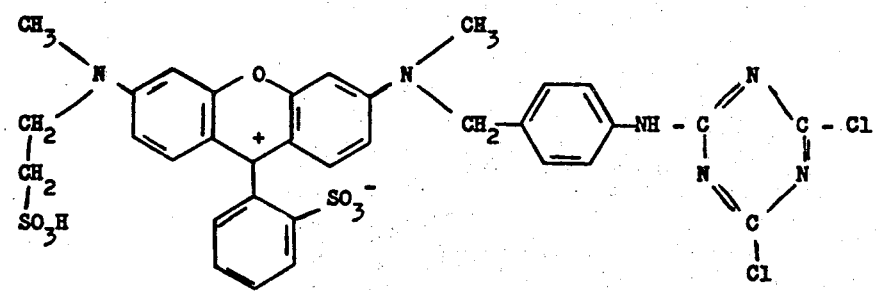

4. A dyestuff as claimed in claim 1 having the formula:
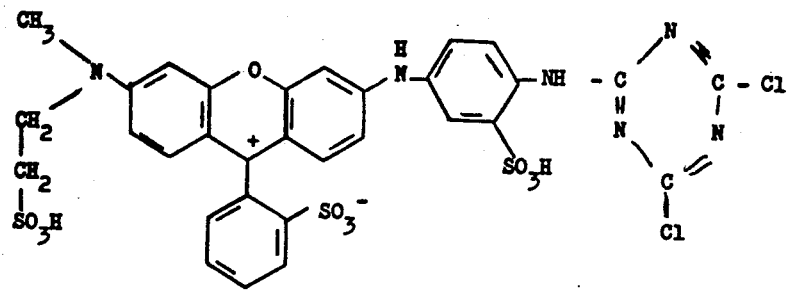
* * * * *